United States Patent [19]
Mansour

[11] Patent Number: 5,197,399
[45] Date of Patent: Mar. 30, 1993

[54] PULSE COMBUSTED ACOUSTIC AGGLOMERATION APPARATUS AND PROCESS

[75] Inventor: Momtaz N. Mansour, Columbia, Md.

[73] Assignee: Manufacturing & Technology Conversion International, Inc., Columbia, Md.

[21] Appl. No.: 730,245

[22] Filed: Jul. 15, 1991

[51] Int. Cl.$^5$ .......................... F23J 11/00; F23J 15/00
[52] U.S. Cl. .................................... 110/345; 110/212; 110/216; 422/182; 431/1
[58] Field of Search ............... 110/216, 345, 344, 347, 110/212, 266; 431/1; 122/24; 60/39.38, 39.76, 39.77; 422/182

[56] References Cited

U.S. PATENT DOCUMENTS

| | | |
|---|---|---|
| 2,539,466 | 1/1951 | Parry . |
| 2,619,415 | 11/1952 | Hemminger . |
| 2,623,815 | 12/1952 | Roetheli et al. . |
| 2,680,065 | 6/1954 | Atwell . |
| 2,683,657 | 7/1954 | Garbo . |
| 2,937,500 | 5/1960 | Bodine, Jr. . |
| 2,979,390 | 4/1961 | Garbo . |
| 3,246,842 | 4/1966 | Huber . |
| 3,333,619 | 8/1967 | Denis . |
| 3,606,867 | 9/1971 | Briffa . |
| 3,738,290 | 6/1973 | Belter ............................ 431/1 X |
| 3,966,634 | 6/1976 | Sacks . |
| 4,529,377 | 7/1985 | Zinn et al. . |
| 4,655,146 | 4/1987 | Lemelson . |
| 4,682,985 | 7/1987 | Kohl . |
| 4,699,588 | 10/1987 | Zinn et al. . |
| 4,708,159 | 11/1987 | Lockwood, Jr. . |
| 4,773,918 | 9/1988 | Kohl . |
| 4,940,405 | 7/1990 | Kelly ........................................ 431/1 |
| 4,951,613 | 8/1990 | Harandi et al. . |

FOREIGN PATENT DOCUMENTS

| | | |
|---|---|---|
| 2301633 | 9/1976 | France . |
| 8200047 | 1/1982 | PCT Int'l Appl. . |
| 644013 | 10/1950 | United Kingdom . |
| 665723 | 1/1952 | United Kingdom . |

*Primary Examiner*—Edward G. Favors
*Attorney, Agent, or Firm*—Dority & Manning

[57] ABSTRACT

An improved apparatus and process for removal of particulates entrained in a gas stream are provided. The removal process employs a pulse combustor to provide an acoustic pressure wave to acoustically enhance bimodal agglomeration of particulates which may be collected and removed using a conventional separation apparatus. A particulate having a size different from the size of the particulate in the gas stream to be cleaned is introduced into the system to effectuate the bimodal process. The apparatus may be employed as a direct fired system for improved operation of gas-operated equipment such as a gas turbine, or may, alternatively, be employed as an add-on subsystem for combustion exhaust clean-up. Additionally, the added particulate may be a sorbent for effecting sorption of other contaminants such as sulfur. Various other particulates for contaminant removal may also be introduced into the system as exemplified by alkali-gettering agents.

39 Claims, 4 Drawing Sheets

PULSE COMBUSTED ACOUSTIC AGGLOMERATION APPARATUS AND PROCESS

FIELD OF THE INVENTION

The present invention relates to a pulsed combustion apparatus and process for acoustically agglomerating particulates produced by the combustion of fuels so that the particulates may be removed from the combustion effluent stream.

BACKGROUND OF THE INVENTION

A major concern with the utilization of certain fuels to directly fire conventional power generation systems is the particulates produced by combustion of the fuels. These particulates remain in the combustion gas stream. Because the gas stream running such systems can adversely impact on the life of turbines and the like, the gas stream should be substantially free of particulate matter. Although conventional devices such as cyclones may be used to remove some of the larger solid particulate matter from combustion gas streams, these devices generally fail to remove the smaller particulates from the streams. Similar problems also exist in many gas streams in which the particulate suspended matter originates from other than combustion.

Removal of solid particulate from a gas stream is most important in coal-fuel advanced power generation systems. Particularly, a direct coal-fired gas turbine which uses gas turbines coupled in series with advanced coal combustors has the potential to achieve high thermodynamic cycle efficiencies. The nature of the coal-based fuels, however, has prevented efficient operation and effectiveness of these direct coal-fired gas turbine systems. Conventional gas turbine systems normally employ clean, premium-grade petroleum distillates in the combustion system. In contrast, coal-based fuels produce ash and chemical species such as sulfur and fuel-bound nitrogen not found in appreciable quantities in the petroleum-based fuels. This mineral matter in coal-based fuels potentially impairs gas turbine efficiency, reduces reliability, increases maintenance costs, and adversely impacts the environment. Degradation of the coal-fired gas turbine's airfoil efficiency also occurs through corrosion, deposition, and erosion brought about by particulates and other materials in the gas stream.

Direct coal firing of combustion gas turbines requires means to reduce or eliminate erosion of the turbine blades due to the presence of fly ash and other particulates in the gas stream created by the burning of coal. If such erosion is not reduced, the turbine blade's life span becomes very short, on the order of 100 hours, thus compromising the economic viability of directly coal firing combustion gas turbines.

Direct coal firing may also result in the release of alkali vapors and sulfur compounds in addition to particulate combustion products. Such contaminant emissions cause the turbine blades to corrode quickly.

Fuel-bound nitrogen causes nitrogen oxide ($NO_x$) emissions to also form in the gas stream. Although nitrogen oxides do not affect turbine blades per se, they do represent pollutants that are not desirable in the atmosphere. Methods and processes to either reduce the production of nitrogen oxides or to destroy or remove such pollutants from the flue gas stream are necessary to meet the requirements of the Clean Air Act. Economically viable means for removing pollutants from the turbine exhaust before discharging such exhaust into the atmosphere have not heretofore been available.

Various attempts have been made to overcome the above and other problems to provide an economically feasible and efficient process for direct solid fuel firing of gas turbines. Attempts have also been made to provide a method for removing fine particulates from a gas stream. For example, coal fuels have been ultracleaned prior to combustion to reduce coal-based contaminants. This, of course, imposes substantial financial burdens as well as delays in time for utilization of the coal. In one such approach, the coal is extensively cleaned in an attempt to remove ash and sulfur from the fuel prior to firing. A cold water slurry is made from micronized, deeply cleaned coal and then used as fuel. This approach, of course, is expensive but does produce an essentially oil-like slurry fuel made from coal that requires little modification to the gas turbine engine, The cost of the necessary coal cleaning and slurry preparation, however, is sufficiently high that this approach has essentially been abandoned.

Other attempts to create clean combustion gas streams have utilized modestly clean fuel products in connection with a hot gas clean-up system upstream from the gas turbine. Most of the particulate control devices are secondary or tertiary particulate control devices in that multiple clean-up stages are required to sufficiently clean the particulate-laden gas stream. Generally, such approaches have used a slagging combustor concept for the removal of the bulk ash particulate. The gas turbine coal combustors operate at sufficiently high temperature by controlling the stoichiometry of the combustion air to near stoichiometric, in an adiabatic combustion chamber, so that ash becomes molten and is removed in the form of slag from the flue gas. This approach, however, retains significant amounts of residual fine ash particles (with an average size of 4 microns) in the gas stream which are sufficient to harm the turbine blades.

Slagging combustor systems also often utilize high temperature ceramic filters downstream of the gas turbine combustor and upstream of the turbine itself to capture residual fine ash particulates before they enter the turbine and erode or otherwise damage the turbine blades. Ceramic filters, however, admit a very low surface gas velocity, thus causing a large and unacceptable pressure drop across the filter. This causes the size of such ceramic filters to become prohibitively large and, therefore, very expensive. Furthermore, ceramic filters are unreliable because they are extremely fragile and susceptible to thermal shock and the thermal stresses resulting therefrom. In addition, such filters tend to plug, thereby requiring means for keeping the filters clean without causing a steady pressure drop across the filter as it "loads up" with fine particles.

The high temperatures at which the slagging combustors must operate also tend to increase the amount of nitrogen oxides produced in the combustion process. This, in turn, requires other means downstream from the coal combustor to reduce the concentration of nitrogen oxides in the effluent gas stream.

The high combustion temperatures in the slagging combustors operate at an inappropriate temperature for sulfur capture using dry sulfur sorbents such as limestone or dolomite. Sulfur oxides produced by burning the sulfur-laden coal fuels must, therefore, be removed from the flue gas stream somewhere downstream of the combustor. A further side product created by the high temperature in a slagging combustor is the release of alkali vapors in the gas stream that must also be removed to reduce corrosion of the turbine blades.

Other non-slagging designs utilize dry ash rejection upstream of the turbine. In these designs, sulfur is captured using dry sorbents in a tri-stage combustor. A multi-stage modular design of a combustion apparatus in this approach utilizes a modified tri-stage combustor modified for ash rejection and sulfur capture. An aerodynamic particle separator separates ash rejection. This system has been found to produce hard black deposits on the surface of the combustor quench zone. Involuntary slagging in the quench zone thus results, with hardened pieces breaking off and traveling downstream without resettling on other surfaces of the combustor which could damage the system. Further gas clean-up and nitrous oxides controls must also be employed downstream of the combustor.

Other systems utilize fabric-filter technology to control emissions in standard boiler applications. Fabric filters, however, are not applicable to the gas turbine hot gas clean-up systems.

In summary, effective reduction of suspended particulates in a gas stream created by combustion remains a paramount problem due to the lack of a cost effective, efficient system for particulate removal, particularly very small particulates. Available particulate collection/removal systems are limited by generator operating conditions. New innovative approaches are thus needed to provide a system so that fuel which produces particulates may be employed to operate generators requiring highly cleaned gases. Any such new system should possess a number of attributes, such as high combustion efficiency, high sulfur capture capability, high solid fuel particulate removal, low nitrogen oxide emissions, and high removal of alkali vapors created by the combustion of the fuel. Moreover, a new system providing the above attributes should also be relatively inexpensive and should not require substantial preparation and pre-cleaning of the fuel used for combustion.

Acoustic agglomeration is a process in which high intensity sound is used to agglomerate submicron- and micron-sized particles in aerosols. Agglomeration is, in essence, a pretreatment process to increase the size distribution of entrained or suspended particulates to enable high collection/removal efficiencies using cyclone or other conventional separators. Acoustic waves cause enhanced relative motion between the solid particles, and hence, increases collision frequency. Once the particles collide, they are likely to stick together. As an overall result of acoustic influence, the particle size distribution in the aerosol shifts significantly from small to larger sizes relatively quickly. Larger particles may be more effectively filtered from the carrying gas stream by conventional particulate removal devices such as cyclones. The combination of an acoustic agglomeration chamber with one or more cyclones in series provides a promising high-efficiency system to clean particulate-laden gases such as hot flue gases from pressurized combustors.

Acoustic agglomeration of small particles in hot combustion gases and other sources of fine dust-bearing effluent streams has been studied intermittently for many years. Although effective in producing larger-sized particles (5 to 20 microns) for more efficient removal by conventional devices, the prior art methods of acoustic agglomeration are not generally viewed as potential clean-up devices due to their large power requirements. For example, fine fly ash particulates (less than 5 microns in size) have been agglomerated using high-intensity acoustic fields at high frequencies in the 1,000–4,000 Hz range. These higher frequencies were necessary for the disentrainment of the fine particulate so as to effect collisions therebetween, and hence, agglomeration of the fine particles.

In such prior art acoustic agglomeration devices, the acoustic fields have been produced by sirens, air horns, electromagnetic speakers, and the like. The resulting acoustic wave generation for sonic agglomeration requires power estimated to be in the range of 0.5 to 2 hp/1,000 cfm. Significant parasitic power loss is therefore present as noted hereinafter even for efficient horns, sirens and the like which normally have efficiencies ranging from 8 to 10%.

Sirens, air horns and the like require auxiliary compressors to pressurize air needed to operate same. The pressure required is generally well above the pressure available at the gas turbine compressor exit, thus necessitating a means for providing that required pressure if the turbine is to be employed, or utilization of an auxiliary compressor. Electromagnetic sonic devices require special designs and precautions to provide the desired equipment reliability, availability and life. Likewise, powerful amplifiers are required to drive certain speakers in order to deliver 160 decibels (dB) or more of sound pressure. All of the above acoustic systems are thus inefficient from at least a cost standpoint.

Apparatus and processes according to the present invention overcome the above-noted problems of the prior art and possess the desired attributes set forth above by using a pulse combustor arrangement for acoustically enhanced bimodal agglomeration of particulate in a gas stream.

SUMMARY OF THE INVENTION

It is thus an object of the present invention to provide an improved apparatus for removing particulate from a gas stream.

Another object of the present invention is to provide an improved combustor that operates on high sulfur fuels such as coals while providing for clean-up of particulates produced by the burning of such fuels and avoiding unwanted gaseous emissions.

Still another object according to the present invention is to provide a high efficiency pulse combustor system to acoustically-enhance particulate agglomeration.

Another object according to the present invention is to provide an improved process for removing particulate from a gas stream.

It is yet another object of the present invention to provide a means for removing alkali vapors produced during a fuel combustion process.

Another object of the present invention is to provide for contaminant capture and particulate agglomeration of products produced by combustion in a single pass of a gas stream.

Another object according to the present invention is to provide an apparatus for creating a low frequency acoustic field to enhance agglomeration of particulates produced during combustion.

A further object according to the present invention is to provide a pulse combusted contaminant removal subsystem for adding to the exhaust system of an existing combustor.

Another object according to the present invention is to provide a pulse combusted apparatus for removing gas stream particulates that produces reduced nitrogen oxides emissions.

Another object according to the present invention is to provide a means for capturing and removing sulfur derivatives from a combustion gas stream.

It is yet another object of the present invention to provide an improved process for removal of particulates from a gas stream.

Another object of the present invention is to provide an improved process for sorption of contaminants from a gas stream and bimodal particulate agglomeration in a single pass through the system.

Yet another object of the present invention is to provide a process to accomplish enhanced cleaning of a gas stream.

Generally speaking, apparatus according to the present invention includes a means for receiving a gas stream so that a gas stream having particulates suspended therein may pass therethrough, a pulse combustor means in communication with the gas stream receiving means, said pulse combustor means being capable of producing a pulsating stream of hot combustion products and an acoustic wave having a frequency within the range of from about 20 to about 1500 Hz which acts on the gas stream, and means for introducing a second particulate into said gas stream so that acoustically enhanced bimodal particulate agglomeration occurs for subsequent enhanced particulate removal.

More specifically, in preferred arrangements, the second or further particulate is introduced into the combustion product stream within the pulse combustor means, and most preferably at or near the junction of the combustion chamber and the resonance tube(s). Likewise in preferred arrangements, the second particulate is a sorbent for a contaminant in one of the streams, such as a sulfur derivative which enables sorption of the contaminant and bimodal agglomeration of the suspended particulate matter. In such an arrangement, introduction of the sorbent at or near the junction of the combustion chamber and the resonance tube yields a highly porous sorbent for better sorption of contaminant.

Generally speaking, the process according to the present invention includes the steps of pulse combusting a fuel to produce a hot combustion product stream and an acoustic pressure wave having a frequency within the range of from about 20 to about 1500 Hz to act on a gas stream having particulates suspended therein and introducing into the gas stream a second particulate having a size distribution different than the size distribution of the suspended particulate in the gas stream so that acoustically enhanced bimodal agglomeration of particulates occurs to permit enhanced removal.

More specifically, in the present process, the size distribution of the introduced particulate is preferably greater than the size distribution of the suspended particulate, and is also a sorbent for contaminants in the gas stream such as sulfur compounds. Further, in a preferred arrangement, the particulate, and especially if a sorbent, is introduced into the pulse combustor means around the junction of the combustion chamber and resonance tube.

BRIEF DESCRIPTION OF THE FIGURES

The construction designed to carry out the invention will be hereinafter described, together with other features thereof. The invention will be more readily understood from a reading of the following specification and by reference to the accompanying drawings forming a part thereof, wherein an example of the invention is shown and wherein.

DESCRIPTION OF THE PREFERRED EMBODIMENTS

Figure 1:
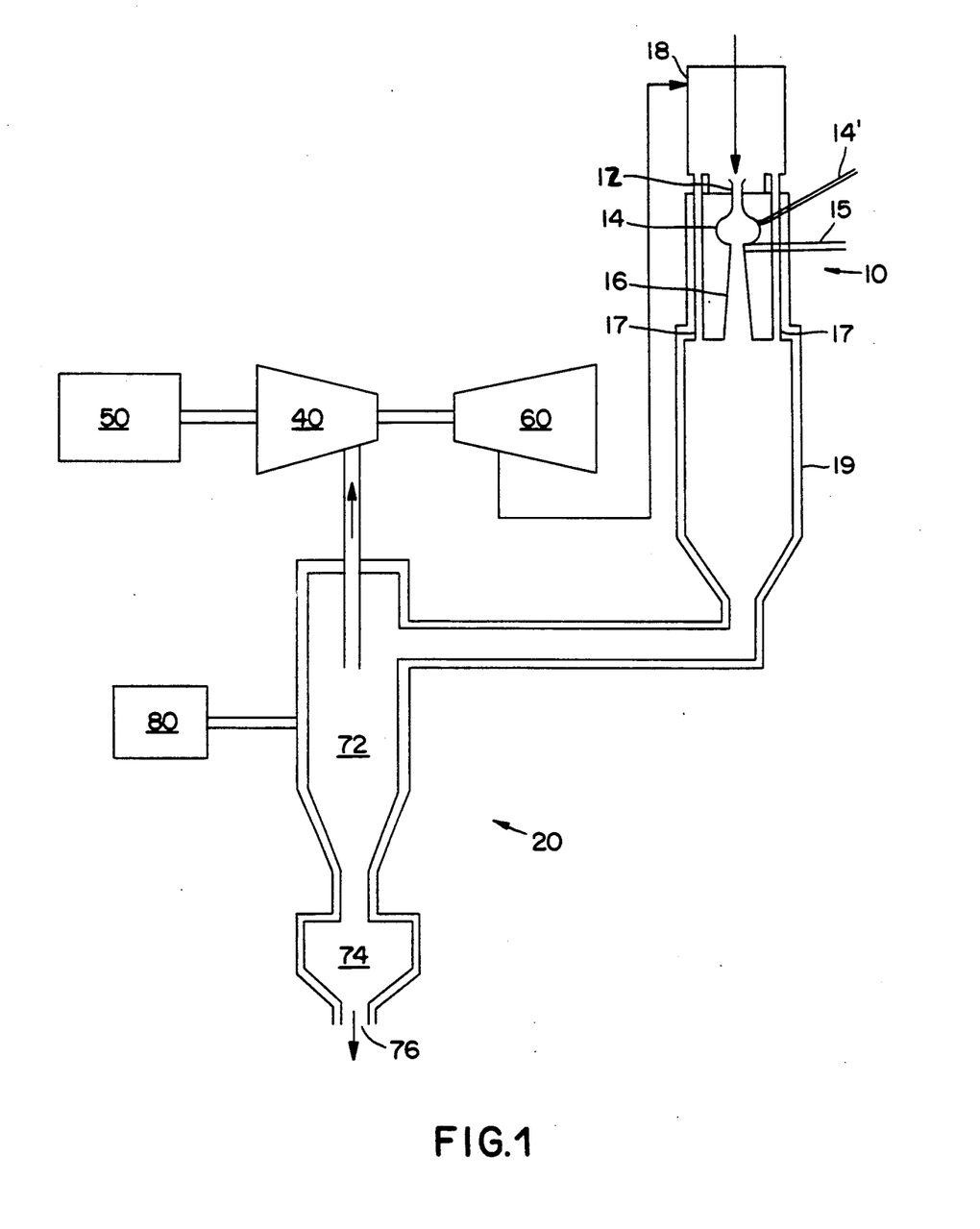
FIG. 1 is a schematic illustration of an apparatus for removal of particulates entrained in a gas stream according to the teachings of the present invention.

One preferred apparatus for removing particulates entrained in a gas stream according to the present invention integrates a pulse combustor means with a particulate collection/removal means as illustrated in FIG. 1, prior to gas introduction to a turbine generator. In FIG. 1, a pulse combustor means, generally 10, is connected in line in communication with particulate collection/removal means, generally 20, so that agglomerates formed in a gas stream passing therethrough can be removed from the gas stream by collection/removal means 20. After the particulate collection/removal means 20 separates particulates from the combustion gas stream, the gas stream continues, in this particular embodiment, to operate a gas-operated turbine generator 40. Turbine 40 generates rotary mechanical power supply to a generator 50 and an air compressor 60. Because the gas stream supplied to turbine 40 has been subjected to the acoustic agglomeration and removal of particulate material according to the present invention,.the gas stream is sufficiently clean for operating turbine 40 without significant adverse impact on turbine 40.

Pulse combustor means 10 includes a fuel valve means 12 which preferably is an aerodynamic valve (fluidic diode), though a mechanical valve or the like may also be employed. A combustion chamber 14 is in communication with valve means 12 and receives fuel-air mixtures therefrom on demand. A resonance tube or tailpipe 16 is in communication with combustion chamber 14. The apparatus of the present invention further includes means 15 for introducing second particulate into the agglomerator. This added particulate is preferably introduced at pulse combustor means 10 as illustrated and will combine with particulates in the hot combustion product stream to form agglomerates as discussed hereinafter. Additionally, pulse combustor means 10 may include an air plenum 18 and a thrust augmenter (not shown). Resonance tube 16 may be a single tube or tailpipe as shown or a plurality of tubes and, in one preferred arrangement, continuously flares outwardly from combustion chamber 14. Resonance tube 16 with a flared configuration acts as a diffuser to reduce the gas exit velocity from combustion chamber 14 and provides for recirculation of combustion products and increased particulate resonance time within the pulse combustor means 10.

In the embodiment shown in FIG. 1, compressed air from compressor 60 is fed to air plenum 18 for augmenting the thrust of the fuel mixture fed into pulse combustor means 10, though such is not necessary. The resonance chamber 16 is arranged so that its outer free end permits combustion products produced in combustion chamber 14 to enter into means for receiving a gas stream exemplified by section 19, though as mentioned hereinafter, many different arrangements are within the purview of the present invention. Gas flows through receiving means 19 and agglomeration of particulate therein occurs as described herein.

Figure 3:
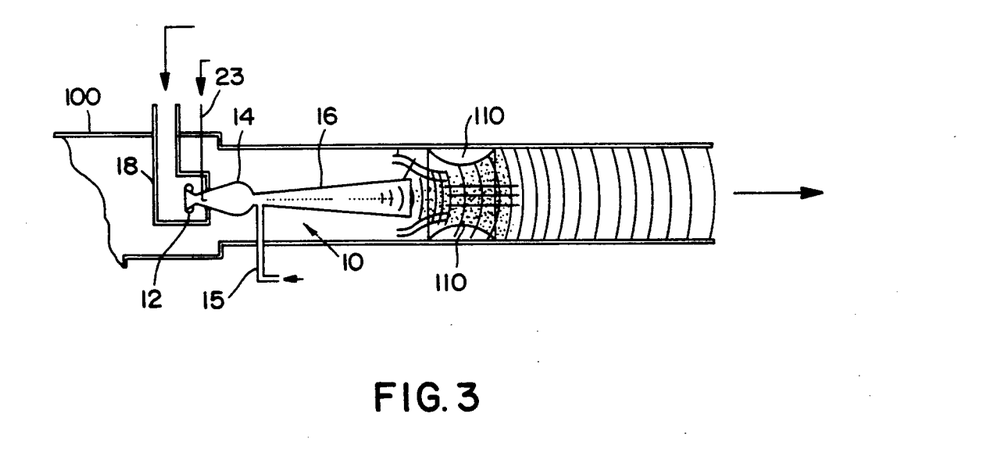
FIG. 3 is a schematic illustration of an apparatus for removal of particulates entrained in a gas stream according to the present invention shown as a clean-up system added on to the exhaust system of an existing combustor.

In the particular embodiment shown in FIG. 1, the pulse combustor apparatus is a self-contained direct fired system as opposed to an add-on emissions control subsystem described as shown in FIG. 3. Hence, the gas stream is the stream of combustion products from combustion chamber 14, and contains undesirable particulates to be cleaned according to the present invention and supplied to turbine 40.

The particulate collection/removal means 20 in communication with pulse combustor means 10 may employ a cyclone 72, bag house, scrubber or other conventional solids separator device. As shown in FIG. 1, cyclone 72 is provided with a duct pot 74 having an opening 76 for removal of solid waste therefrom. Collection/removal means 20 is also in communication with gas turbine 40 so that the cleaned gas stream may act directly thereon in a proper operational mode. The entire apparatus may be refractory-lined or may be water-cooled, depending on the heat requirements of the system.

In the embodiment shown in FIG. 1, the air plenum 18 communicates with bypass air conduits 17 through which additional air may enter into the gas stream receiving means 19 so as to further increase agglomeration of the particulates.

A pulse combustor such as preferably employed in the present invention typically includes at least one aerodynamic valve or fluidic diode, a combustion chamber and at least one resonance tube. An appropriate fuel and air mixture passes through the valve into the combustion chamber and is detonated. During start-up, an auxiliary firing device is provided. Explosion of the fuel mixture causes a sudden increase in volume and evolution of combustion products which pressurizes the combustion chamber. As the hot gas expands, preferential flow in the direction of the resonance tube is achieved with significant momentum. A vacuum is then created in the combustion chamber due to the inertia of the gases within the resonance tube. Only a small fraction of exhaust gases are then permitted to return to the combustion chamber, with the balance of the gas exiting the resonance tube. Because the pressure of the combustion chamber is then below atmospheric pressure, further air-fuel mixture is drawn into the combustion chamber and auto-ignition takes place. Again, the valve means thereafter constrains reverse flow, and the cycle begins anew. Once the first cycle is initiated, operation is thereafter self-sustaining.

The fuel valve utilized in many pulse combustion systems is a mechanical "flapper valve" arrangement. The flapper valve is actually a check valve permitting flow into combustion chamber, and constraining reverse flow by a mechanical seating arrangement. Although such a mechanical valve may be used in conjunction with the present system, an aerodynamic valve without moving parts is preferred. With aerodynamic valves, during the exhaust stroke, a boundary layer builds in the valve and turbulent eddies choke off much of the reverse flow. Moreover, the exhaust gases are of a much higher temperature than the inlet gases. Accordingly, the viscosity of the gas is much higher and the reverse resistance of the inlet diameter, in turn, is much higher than that for forward flow through the same opening. Such phenomena, along with the high inertia of exhausting gases in the resonance tube, combine to yield preferential and mean flow from inlet to exhaust. Thus, the preferred pulse combustor is a self-aspirating engine, drawing its own air and fuel into the combustion chamber followed by auto-ignition.

Pulse combustor systems regulate their own stoichiometry within their ranges of firing without the need for extensive controls to regulate the fuel feed to combustion air mass flow rate ratio. As the fuel feed rate is increased, the strength of the pressure pulsations in the combustion chamber increases, which in turn increases the amount of air aspirated by the aerodynamic valve, thus allowing the combustor to automatically maintain a substantially constant stoichiometry over its designed firing range. The induced stoichiometry can be changed by modifying the aerodynamic valve fluidic diodicity.

The preferred pulse combustor used herein for coal-firing is based on a Helmholtz configuration with an aerodynamic valve. The pressure fluctuations, which are combustion-induced in the Helmholtz resonator-shaped combustor, coupled with the fluidic diodicity of the aerodynamic valve, causes a bias flow of air and combustion products from the combustor's inlet to the resonance tube exit. This results in the combustion air being self-aspirated by the combustor and for an average pressure boost to develop in the combustion chamber to expel the products of combustion at a high average flow velocity (over 1,000 feet/second) through the resonance tube.

The production of an intense acoustic wave is an inherent characteristic of pulse combustion. Sound intensity adjacent to the wall of the pulse combustion chamber is often in the range of 110–190 dB, and may be altered depending on the desired acoustic field frequency to accommodate the specific application undertaken by the pulse combustor.

Rapid pressure oscillation through the combustion chamber generates an intense oscillating flow field. In the case of coal combustion, the fluctuating flow field causes the products of combustion to be swept away from the reacting solid coal thus providing access to oxygen with little or no diffusion limitation. Secondly, pulse combustors experience very high mass transfer and heat transfer rates within the combustion zone. While these combustors tend to have very high heat release rates, (typically ten times those of conventional burners), the vigorous mass transfer and high heat transfer within the combustion region result in a more uniform temperature. Thus, peak temperatures attained are much lower than in the case of conventional systems, and results in a significant reduction in nitrogen oxides ($NO_x$) formation. The high heat release rates also result in a smaller required combustor size for a given firing rate and a reduction in the resonance time required.

The present invention is especially useful when the pulse combustor unit burns low cost, high sulfur, high ash, standard grind (pulverized) coal fuels. The particulate agglomeration and its efficient removal by the present invention permits use of standard grind coal in the present combustion device. This coal, in particular, yields increased ash particulate size over that produced by combustion of micronized fuels, which provides more foci for the agglomeration of fine fly ash particulate in the combustion gas stream at lower frequencies as described herein. An economic advantage is clearly obtained because standard grind fuels are less expensive than micronized coals. It is also advantageous to use coals that are not deeply beneficiated for extensive reduction of ash content. The increased mass loading of medium to large ash particulate which would be produced from the combustion of moderately beneficiated fuels contributes to the efficiency of the bimodal dynamic filter effects in agglomerating particulates according to the present invention. Of course, use of the standard grind fuel also results in a higher content of contaminants such as sulfur derivatives and in particular sulfur dioxide, and the release of alkali vapors, such as sodium chloride, potassium chloride, and sodium sulfate. These further contaminants, however, may be effectively removed from the gas stream according to the present invention and combustion products formed from the standard grind coal may be effectively agglomerated and removed.

The oscillating flow field created by the pulse combustor provides for high interphase and interparticle mass transfer rates. Due to the reasonably high temperature, combustion of fuel fines is substantially complete at the exit of the pulse combustor resonance tube. Also, temperature may be maintained below that necessary for ash fusion for a non-slagging process as is preferred. However, temperature may be elevated to ash fusion temperature for a slagging process if desired. Further, additional residence time in the outwardly flaring resonance tube insures high carbon conversion and, in turn, high combustion efficiency.

Devolatilization and combustion of fuel fines in the pulse combustor also enable the release of a significant portion of the sulfur in the fuel by the time the fuel fines leave the tailpipe or resonance chamber. According to the present invention as more particularly defined hereinafter, the introduced particulate can be, and preferably is, a sorbent for sulfur which affords a high probability of sulfur capture by the sorbent particulate. Fines recirculation as a consequence of the design of the resonance tube also assists in achieving high sulfur capture efficiency at low Ca/S molar feed ratios, which leads to lower sorbent and waste disposal costs.

Pulse combustors are inherently low $NO_x$ devices. The rate of heat transfer in the pulsating flow is higher than in the conventional steady flow systems, resulting in a lower overall temperature in the combustion chamber. Also, the high rates of mixing between the hot combustion products and the colder residual products from the previous combustion cycle and the incoming cold reactants create a short resonance time at high temperature thus quenching the $NO_x$ production. These complementary mechanisms create an environment resulting in low $NO_x$ production. Consequently, the $NO_x$ emissions from systems of the present invention are believed to be lower than that of conventional combustors.

The direct-fired pulse combustion particulate removal system shown in FIG. 1 operates in the following manner. A fuel-air mixture is admitted to the air plenum 18 and then through one or more valve means 12 to combustion chamber 14. The initial mixture entering the combustion chamber 14 is ignited by an ignition means such as a spark, a gas burner or the like 14'. The combustion products formed then resonate through resonance tube 16. As described above, once the initial combustion cycle is begun, the pulse combustion becomes self-sustaining.

Pulse combustor means 10 produces an intense acoustic wave by combustion-induced pressure oscillations when fired with a suitable fuel. The sonic field produced by combustion resonates through the resonance tube 16 and acts directly on the gaseous stream carrying particulates. No compressed air (such as that which drives a siren or an air horn) or electricity (used to drive an electromagnetic speaker) is required. As explained above, however, additional compressed air (which may be recycled) may be supplied to the air plenum 18 for increased thrust augmentation. The pulse combustor thus eliminates the need for parasitic power to generate the acoustic field.

In the direct coal-fired apparatus and process according to the present invention, the pulse combustor means produces a pulsating stream of hot combustion products having a first particulate entrained therein. This first particulate is generally fly ash fines resulting from combustion of the fuel-air mixture and of a size of about 4 microns. The acoustic wave produced by pulse combustor means 10 acts on the gaseous stream to effectuate an acoustically-enhanced bimodal agglomeration of the particulate in the gaseous stream when extra or second particulate of a different size distribution is present. Bimodal production of particulate agglomerates enlarges overall particulate size and thereby permits enhanced removal of the agglomerates by conventional means. Efficiency of the agglomeration process is enhanced by increasing the total mass loading of particulate dispersed in the gaseous stream. For a given size distribution, a higher mass loading provides more particles per unit volume and, consequently, an enhanced likelihood for collisions among the particles which leads to agglomeration. Accordingly, the addition of a second mode, herein referred to as the introduction of a second particulate into the hot combustion product stream or other stream increases the total mass. Therefore, a more efficient agglomeration process is produced by the bimodal procedure.

In addition to this mass-dependent phenomenon, a further increase in particle collisions, and therefore an increase in agglomeration, is produced due to intensified orthokinetic interactions between the two modes. Hydrodynamic interactions also occur. Preferably, the second particulate introduced into the hot combustion product stream will have a larger size distribution than particulate already entrained in the gas stream wherefore more relative motion occurs among the particles, enhancing agglomeration.

The second particulate material also is preferably introduced at or near the interface between the resonance tube 16 and the combustion chamber 14 which is a region of high heat release and high heat transfer, particularly when the second particulate is a sorbent for sulfur or the like. High heat thus provides a rapid rate of sorbent calcination, providing high porosity in the calcined sorbent which, in turn, generates high surface-to-mass ratios without the need for micronization of the sorbent. Together with the effect of the oscillating flow field on gas mass transfer, introduction of particulate at a point at which the acoustic wave may act on the particulate thereby enhances sorbent utilization at relatively low calcium-to-sulfur molar ratios.

Pulse combustors according to the present invention produce low frequency acoustic fields having frequencies in the range of from about 20 to about 1500 Hz. Higher frequencies give rise to more cycles of particulate matter per unit time within the gas stream acted on by the acoustic field. However, higher frequencies tend to yield proportionately smaller amplitude of relative motion between the particulates per cycle.

As previously explained, higher frequencies often effectuate significant disentrainment of fine particulates in the gas stream. However, because, as explained herein, the particle size of the second particulate introduced into the hot combustion product stream is preferably selected to be larger than particulates already in the stream, the frequency required to effect disentrainment is reduced. For example, a 100 micron particulate in a gas stream at 1600° F. and 10 atmospheres would have about a 0.1 entrainment factor at a frequency of only 100 Hz. Thus, the oscillatory displacement amplitude of the particulate is only one-tenth that of the gas stream with significant (about 90% of gas displacement amplitude) relative displacement between the gas stream and the particulate. The fine ash particulates, however, would be essentially totally entrained in the oscillating gas flow field with entrainment factors in excess of 0.99 at a frequency of about 100 Hz. This, in turn, leads to collisions between the fine ash particulates and the larger sorbent agglomeration foci, causing agglomeration of the fine ash particulates to the second particulates. Because the amplitude of relative motion between the fine ash particulates entrained in the gas stream and the second particulates would be on the order of 80–90% of the amplitude of the oscillatory gas displacement and such displacements are higher for low frequencies, the collisions per cycle of oscillations is thereby increased. Thus, this bimodal approach to particulate agglomeration, which basically means that particulates of a different size distribution are agglomerated together, provides a form of a dynamic filter to collect the fine ash particulates on the second, larger particulates introduced into the gas stream.

Preferably, the pulse combustor will generate acoustic fields having frequencies of from about 50 to about 250 Hz. The high intensity acoustic fields also preferably have sound pressure levels of generally greater than 160 dB, resulting in significantly higher mass transport properties. These properties increase sorbent utilization by increasing the rate of sulfur derivatives transported to the sorbent particle surfaces and increases penetration into the pore structure of the calcinated sorbent particles. The high intensity acoustic field further enhances acoustic agglomeration, changing the particulate size distribution such that small micron and submicron particulates are agglomerated to become larger particulates which can then be removed more efficiently by conventional particulate removal devices.

According to the present invention, capture of contaminants such as sulfur derivatives, occurs simultaneously with the agglomeration of the particulates in the gas stream. The second particulate which is introduced into the gas stream, particularly in a coal-fired operation, is preferably a sulfur sorbent such as limestone, dolomite, hydrated lime, or the like and is preferably selected so that its particle size is larger than the size of the particulate to be agglomerated. Second particulate size distribution is preferably in a range of from about 100 to about 150 microns. Larger second particulate reduces the frequency required to effect significant disentrainment of the particulate in the gaseous stream. This leads to collisions between the particulate and the larger sorbent particles thus agglomerating the particulates to the sorbent. Particle size and size distribution as used herein shall refer to sizes of particles within a distribution scheme. Hence, a larger size or size distribution of a particulate refers to a size distribution scale in which larger particles are present.

Porous calcium oxide sorbent particles react readily with the sulfur derivatives such as $SO_2$ contained in the hot combustion gases under the influence of the intense acoustic field to form solid calcium sulfate ($CaSO_4$) in and around the pores of the sorbent as well as on the surface. The sulfated particles and particulate ash from the combustion process are agglomerated and may be easily removed from the gas stream.

Effective acoustic enhancement of particulate agglomeration will be most pronounced as sorbent particle size increases. This is due to the fact that the acoustically-enhanced intraparticle flow will ameliorate the increasing diffusional limitations encountered for larger particle sizes. Both enhanced desulfurization and efficient particle agglomeration and removal can be simultaneously achieved without the penalty of using expensive sorbent materials. Simultaneous contaminant capture and agglomeration as used herein refers to generally same time and in the same pass.

Once the agglomerates are formed, the gas stream containing same travels through collection/removal means 20 where the agglomerates are disentrained from the gas stream and removed. The cleaned gas stream may then be used to drive gas turbine 40 which in turn may power compressor 60 and/or generator 50. If turbine 40 or some other device to be operated by the gas requires a heated gas, then the collection/removal means may be heated to maintain the gas stream at a desired elevated temperature. The cleaned gas stream containing essentially gaseous products without significant pollutants such as sulfur derivatives and nitrogen oxides may be emitted to the atmosphere without significant pollutants.

Figure 2:
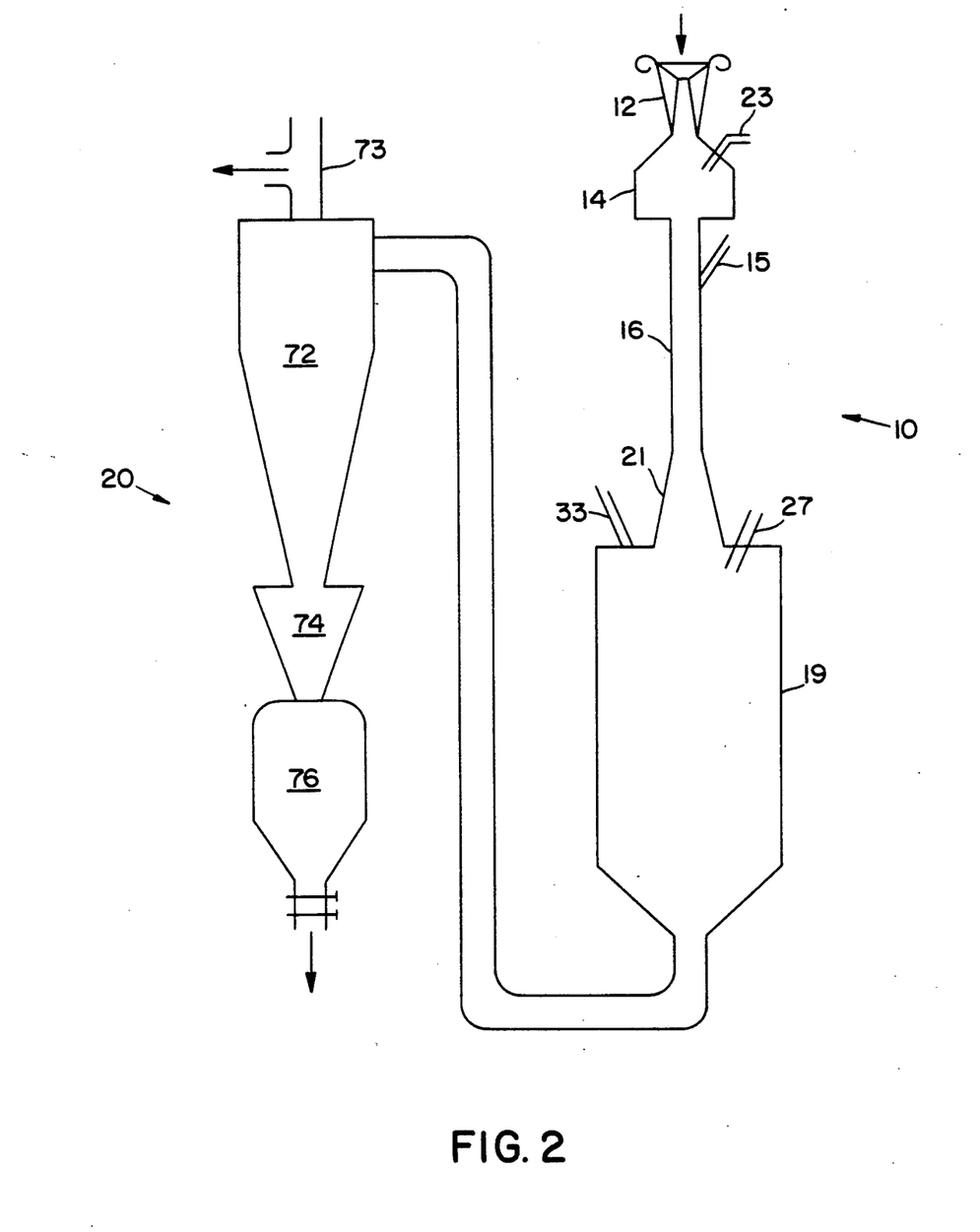
FIG. 2 is a schematic illustration of a further embodiment an apparatus for removal of particulates entrained in a gas stream according to the present invention.

A further embodiment of apparatus of the present invention is shown in FIG. 2, and includes for elements shown in FIG. 1, like numbered members indicating like elements. An injection port 23 is included in communication with combustion chamber 14 of pulse combustor 10 beyond valve means 12 for further fuel addition. Also, instead of a continuously flaring resonance chamber 16 as shown in FIG. 1, FIG. 2 illustrates a relatively straight resonance chamber 16 having a diffuser section 21 at its outer end. Diffuser section 21 allows for recirculation of fines to decrease $NO_x$ emissions.

Like the apparatus of FIG. 1, FIG. 2 illustrates a second particulate introduction means 15 for adding second particulate into the hot combustion products stream. Second particulate introduction inlet 15 may be located along resonance chamber 16 as shown in FIGS. 1 and 2 or may, alternatively, be located anywhere within the particulate removal apparatus where the particulate will be acted upon by the acoustic wave generated by the pulse combustor. For example, second particulate may be introduced into the apparatus at a point beyond the resonance tube 16. In such an apparatus, the second particulate introduction means should be positioned so that the acoustic wave will act on the gas stream for enhanced agglomeration between the particulates. As explained above, the second particulate is preferably a sorbent for effecting sorption of various contaminants such as sulfur derivatives. Moreover, because the invention relates to a bimodal apparatus and process, the size distribution for the second particulate introduced into the gaseous stream should be different from that of the particulate initially contained in the gas stream. In the most preferred embodiment, the second particulate should have the larger size.

Apparatus of FIG. 2 further employs a further inlet means 27 for introducing a third material into the gas stream. Alkali vapors such as sodium chloride, potassium chloride and sodium sulfate are often formed during the combustion of solid fuels. These alkali vapors may react with the sulfur-laden sorbent particles forming alkali sulfides on the sorbent's surfaces and preventing further continued effective sorption. Alkali-gettering materials such as diatomaceous earth, emathlite silica, bauxite, vermiculite, hectorite, and kaolin, may be injected through third introduction means 27 to capture such alkali vapors. Injection of alkali-gettering materials also further enhances the dynamic filter efficiency of the bimodal agglomeration process due to the further increase in the mass loading of the larger agglomeration foci in the flue gas which removes fines particulate from the gas stream. Further, in the embodiment shown in FIG. 2, additional air may be injected through inlet 33 for further increasing the rate of collisions between the particles during agglomeration.

Pulse combustor means 10 is illustrated in FIG. 2 in communication with a particulate collection/removal means 20 having the basic arrangement described above with respect to FIG. 1. Collection/removal means 20 includes a cyclone 72, a duct port 74 and, in addition, may include a solids holding tank 76 for further holding particulates removed from the gas stream. Cyclone 72 has an outlet port 73 through which the cleaned gas stream may pass to a turbine (not shown) or other gas operated device. Cyclone 72 may be heated as previously described, may be ambiently operated cyclone, or water-cooled, whichever is preferred. In a heated arrangement, a conventional heating unit 80 may provide the heat to cyclone 72 and other parts of the apparatus.

While the present invention is illustrated as relating to a system for operation of a gas powered device, the same concept can be applied to any system that requires or is beneficiated by a clean gas stream, or cleaning of the gas stream prior to its introduction to the atmosphere. Consequently, other apparatus such as boilers, heaters or the like could be located between the pulse combustor system and the particulate removal system.

FIG. 3 illustrates an embodiment of the present apparatus employed as an emissions control subsystem, being added to an existing gas stream conduit such as from any combustor, by way of example. Like numerals represent like members as shown in FIGS. 1, 2 and 3. The exemplary combustor (not shown) exhausts a gas stream through conduit 100. A pulse combustor generally 10 is positioned within conduit 100, or otherwise in communication therewith so long as the acoustic field acts on the gas stream within conduit 100. The particulate-containing gas stream flowing from the combustion system (not shown) along conduit 100 forms a combined particulate stream with the hot combustion products stream produced by the pulse combustor means 10. Pulse combustor means 10 may include the previously described elements, but at least the basic valve means, combustion chamber and resonance tube.

As previously described, a second particulate is introduced into the hot combustion product stream from pulse combustor 10 through second particulate introduction means 15. The second particulate is preferably introduced near the juncture of combustion chamber 14 and resonance tube 16, which allows for the high temperature effect to act on the second particulates. In instances when adequate particle size distribution differences exist between particles in conduit 100 and in the product stream from pulse combustor 10, further particulate addition may not be necessary.

The combined particulate gas stream formed by the exhaustion products within conduit 100 and the combustion products from pulse combustor unit 10 lead to agglomerate formation in conduit 100. The acoustic field produced by the pulse combustor 10 enhances this agglomeration such that the agglomerates may then be routed to a conventional collection/removal means (not shown). After particulate removal, the flue gas may power a turbine or other device or be released as clean effluent to the atmosphere.

An eductor 110 is located within conduit 100 generally at the location where exhaust products from the existing combustor and the combustion products from the pulse combustor merge into a combined stream. Eductor 110 may be a conventional device that allows for mixing of gases, and should be placed in a region of high gas flow acceleration and subsequent deceleration to further enhance particle disentrainment and mass transfer. The eductor then promotes particulate agglomeration due to the difference in the degree of disentrainment of the larger particulate versus the smaller particulates (normally easily entrainable solid ash particles). Incorporation of an eductor 110 also facilitates air staging for enhanced $NO_x$ emissions control, superior acoustic coupling between the resonance chamber 16 and the area of the conduit 100 where acoustic agglomeration occurs and provides for good mixing between the solid and gas phases in the stream.

Figure 4:
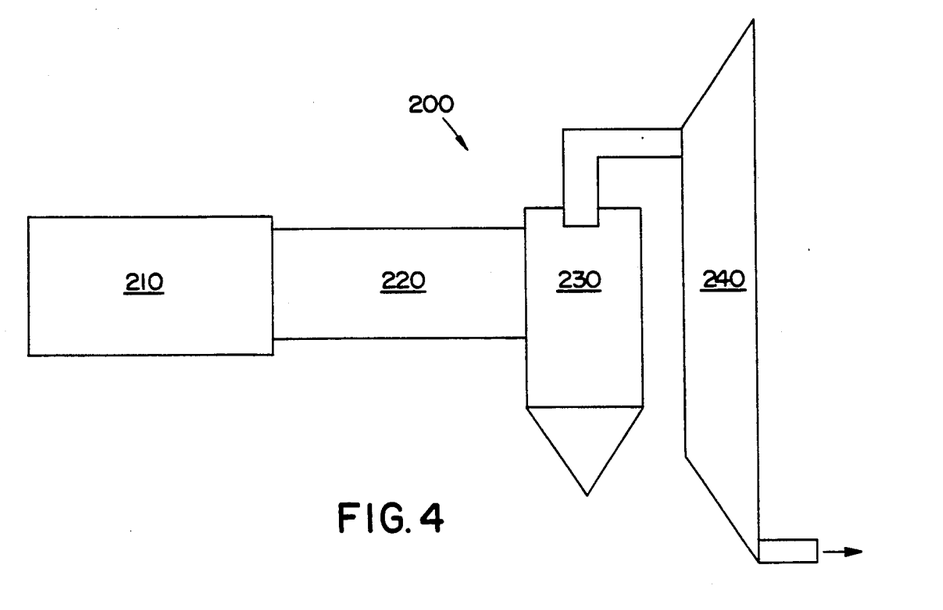
FIG. 4 is a schematic illustration of an apparatus for removal of particulates entrained in a gas stream shown as an add-on system to an existing combustor-driven turbine.

FIG. 4 schematically illustrates pulse combusted particulate removal apparatus used as an add-on subsystem as described with respect to FIG. 3. Particulate removal apparatus of the present invention generally 200 is shown in line between an existing combustion system 210 and a gas operated device 240 and includes a pulse combustion means 220 and a particulate collection/removal means 230. The system may be arranged as shown in FIG. 3 or otherwise. Likewise as noted above, for some operations, the clean-up may follow the operating system such as a boiler for the principle reason of effluent cleaning.

Figure 5:
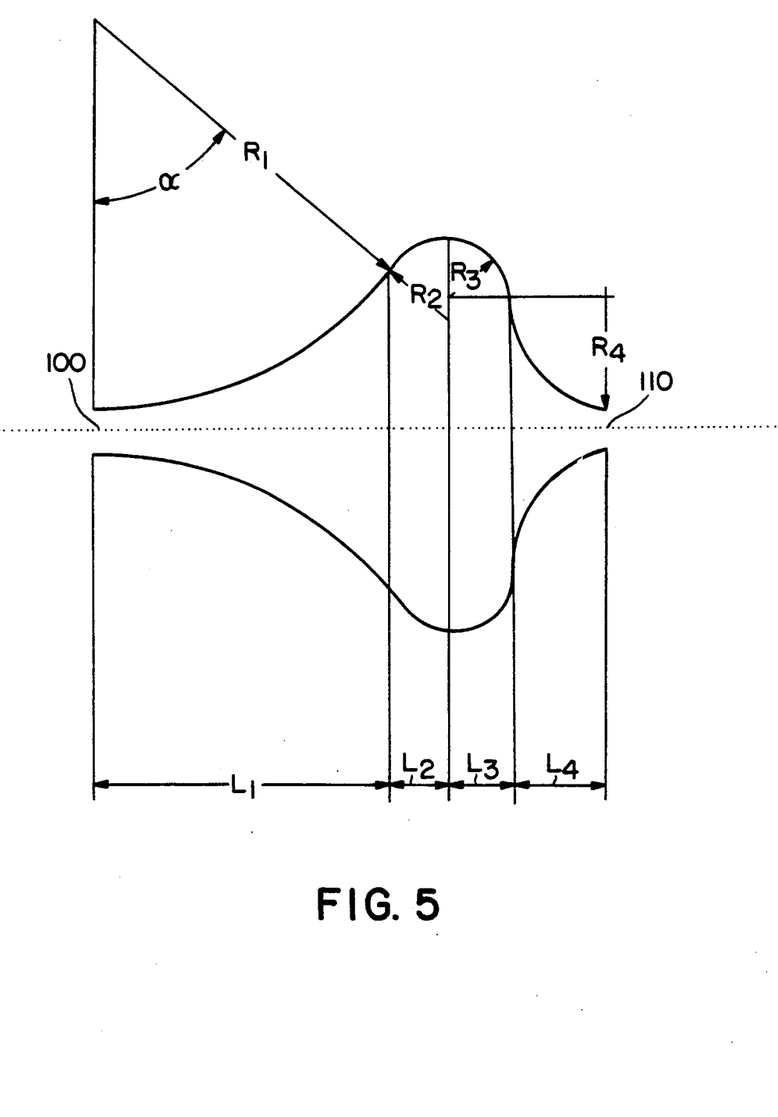
FIG. 5 is an illustration of one preferred pulse combustor design.

In certain particular embodiments of the present invention, a pulse combustion chamber design of the type shown in FIG. 5 is preferred. This design employs quadratic form generators to define an axisymmetric geometry that would be alike to accommodate a number of design and chamber performance attributes.

Alphanumeric legends on the pulse combustor illustrated in FIG. 5 correspond to following dimensions which relate to a slagging combustor design (as described hereinafter) having a heat output of 7.5 MMBtu/hr and may be used for determining other pulse combustor designs. Inlet port 100 has a diameter of 5.69 inches and exit port 101 has a diameter of 5.06 inches. The lengths of the different sections of the combustion chamber are as follows: $L_1$ is 16.17 inches; $L_2$ is 4.15 inches, $L_3$ is 4.31 inches, $L_4$ is 3.40 inches with a combined length of the combustion chamber from inlet port 100 to exit port 101 of 28.03 inches. The angle $\alpha$ is 40°, length R1 is 25.15 inches, length R2 is 6.46 inches, length R3 is 4.31 inches and length R4 is 3.40 inches.

It has been found that certain ranges are preferred for the operation of the presently claimed pulse combusted particulate removal apparatus. Preferably, sound pressure levels attendant to the pressure wave generated by the pulse combustor unit although lower sometimes, preferably are at least 160 dB at atmospheric pressure: 180 dB at 10 atmospheres, and 200 dB at 20 atmospheres. As previously described, the preferred frequency range for the oscillations of the acoustic wave generated by the pulse combustor should be in the range of from about 20 to 1500 Hz, with a range of from about 50 to about 250 Hz being preferred. The preferred size distribution difference between particulate entrained in the gas stream which is to be removed and second introduced particulate should preferably be such that size of the introduced second particulate is greater than that of the particulate initially entrained in the gas stream. Smaller particulate preferably should not exceed 50 percent by weight of the total particle weight. Preferably, solids mass loading should be not less than 10 g/m$^3$. The preferred mean residence time of the particulate in the resonance tube 16 is from about 2 to about 5 seconds. The preferred gas combustion temperature of the system should be maintained at a temperature less than the temperature at which the particulates being agglomerated begin to slag. This lower temperature prevents the formation of molten materials (slag) and thus insures continued entrainment of the particulate in the gas stream prior to and after agglomeration thereof. Preferably, the gas temperature of the system should be maintained at least 200° F. lower than the softening or initial deformation temperatures of the particular solids. Additionally, the pulse combustor should preferably release heat in a range of from about 1 to about 6 MMBtu/hr.

Although preferred embodiments of the invention have been described using specific terms, devices, concentrations, and methods, such description is for illustrative purposes only. The words used are words of description rather than of limitation. It is to be understood that changes and variations may be made without departing from the spirit or the scope of the following claims.

What is claimed is:

1. Improved apparatus for removal of particulates entrained in a gas stream comprising:
   means for receiving a gas stream having particulates therein for passage of said gas stream therethrough;
   pulse combustor means in communication with said gas stream receiving means for producing a pulsating stream of hot combustion products and an acoustic wave having a frequency within the range of from about 20 to about 1500 Hz which acts on said gas stream, said pulse combustor means further including means for introducing a second particulate into said gas stream so that acoustically-enhanced bimodal agglomeration of particulate materials entrained in said gas stream occurs permitting enhanced removal of said agglomerated particulate materials.

2. Apparatus as defined in claim 1 wherein said pulse combustor means comprises a combustion chamber, fuel valve means in communication with said combustion chamber so that fuel mixtures may be admitted to said combustion chamber, and a resonance tube in communication with said combustion chamber.

3. Apparatus as defined in claim 1 wherein said pulse combustor means is located within said gas stream receiving means.

4. Apparatus as defined in claim 1 wherein said second particulate introduction means is located such that said second particulate will be introduced into said apparatus at a point so that said acoustic wave may act on said second particulate to enhance agglomeration between said second particulate and said particulate entrained in said gas stream.

5. Apparatus as defined in claim 2 wherein said second particulate introduction means is located near the junction of said combustion chamber and said resonance tube.

6. Apparatus as defined in claim 1 further comprising means for removing said agglomerates from said gas stream.

7. Apparatus as defined in claim 6 wherein said removal means is a cyclone.

8. Apparatus as defined in claim 7 wherein said cyclone is heated.

9. Apparatus as defined in claim 1 further comprising means for introducing a third particulate into said gas stream.

10. Improved apparatus for removal of particulates entrained in a gas stream comprising:
    means for receiving a gas stream for passage of said gas stream therethrough;
    pulse combustor means in communication with said gas stream receiving means for producing a pulsating stream of hot combustion products having a first particulate entrained therein and an acoustic wave having a frequency within the range of from about 20 to about 1500 Hz which acts on said gas stream, said pulse combustor means comprising a combustion chamber, fuel valve means in communication with said combustion chamber so that fuel mixtures may be admitted to said combustion chamber, and a resonance tube in communication with said combustion chamber, said resonance tube extending into said gas stream receiving means; and
    means for introducing a second particulate into said gas stream so that enhanced bimodal agglomeration of said particulates occurs to produce agglomerates, said second particulate introduction means located generally at the junction of said resonance tube and said combustion chamber.

11. Improved process for removal of particulates from a gaseous stream comprising the steps of
    bringing a gas stream having particulates entrained therein under the influence of a pulse combusted acoustic pressure wave at a frequency in a range of from about 20 to about 1500 Hz; and
    introducing into said gas stream a second particulate having a size distribution different than particulates entrained in said gas stream, said second particulate being introduced at a location under the influence of said acoustic pressure wave to effectuate acoustic enhanced bimodal particulate agglomeration.

12. A process as defined in claim 11 wherein said pulse combusted acoustic pressure wave accompanies a hot combustion product stream which contains particulate matter to be agglomerated and is merged with a further gas stream in which other particulates are entrained.

13. A process as defined in claim 11 further comprising the step of removing said agglomerates to effectuate enhanced cleaning of said gaseous stream.

14. A process as defined in claim 12 further comprising the step of removing said agglomerates to effectuate enhanced cleaning of said gaseous stream.

15. A process as defined in claim 11 wherein a particulate fuel-air mixture is pulse combusted.

16. A process as defined in claim 11 wherein said second particulate has a size larger than the size of said particulate entrained in said gas stream.

17. A process as defined in claim 12 wherein said second particulate is introduced into said hot combustion product stream so that the weight amount of the larger of said particulates exceeds the weight amount of the smaller of said particulates.

18. A process as defined in claim 12 wherein said second particulate introduced into said hot combustion product stream is a sorbent for capture of contaminants.

19. A process as defined in claim 18 wherein said sorbent is selected from the group consisting of limestone, dolomite, lime, and hydrated lime.

20. A process as defined in claim 18 wherein said contaminants captured by said sorbent include sulfur derivatives.

21. A process as defined in claim 11 wherein said particulate in said gas stream is fly ash produced by the combustion of coal.

22. A process as defined in claim 11 wherein said acoustic pressure wave has a frequency within a range of from about 50 to about 250 Hz.

23. A process as defined in claim 12 wherein the heat produced by said pulse combustion has a temperature less than the temperature at which the said particulates in the streams begin to form slag.

24. A process as defined in claim 12 wherein said gas stream containing other particulates which merges with said hot combustion product stream is the exhaust from a different combustion system.

25. A process as defined in claim 11 further comprising the step of introducing a third particulate into said gas stream in which particulate is entrained.

26. A process as defined in claim 25 wherein said third particulate is an alkali-gettering agent.

27. A process as defined in claim 26 wherein said alkali-gettering agent is selected from the group consisting of diatomaceous earth, emathlite, silica, bauxite, vermiculite, hectorite, and kaolin.

28. A process as defined in claim 13 wherein said gas stream remains hot during removal of said agglomerates therefrom.

29. A process as defined in claim 13 wherein said gas stream which has been cleaned is provided to a device employing a gas stream for operation thereof.

30. A process as defined in claim 29 wherein said device employing a gas stream for operation thereof is a turbine.

31. A process as defined in claim 11 wherein heat produced during said process is maintained in a range of from 1 MMBtu/hr to about 6 MMBtu/hr.

32. A process as defined in claim 11 wherein the gas stream containing the particulate is a hot pulse combustion product stream that is accompanied by said pressure wave.

33. Improved process for removal of particulates from a gaseous stream comprising the steps of:
 pulse combusting a fuel to produce a hot combustion product stream having particulate material entrained therein and an acoustic pressure wave having a frequency within the range of from about 20 to about 1500 Hz;
 introducing into said hot combustion product stream a second particulate having a size larger than the size of said particulate entrained in said hot combustion product stream to effectuate acoustically-enhanced bimodal agglomeration of said particulates; and
 removing said particulate agglomerates from said hot combustion product stream to produce a cleaned gas stream.

34. A process as defined in claim 33 wherein said process further comprises the step of providing said clean gas for operation of downstream equipment.

35. A process as defined in claim 33 wherein said second particulate is a sorbent for sulfur, resulting in sulfur removal from said gas stream.

36. Improved process for removal of particulates from a gaseous stream comprising the steps of:
 pulse combusting a fuel to produce a hot combustion product stream and an acoustic pressure wave at a frequency in a range of from about 20 to about 1500 Hz;
 merging said product stream and pressure wave with an independent gas stream having particulates entrained therein;
 bringing a second particulate material under the influence of said acoustic pressure wave, said second particulate material having a size distribution different than said particulate material entrained in said gas stream so that acoustically enhanced bimodal particulate agglomeration occurs;
 removal of said particulate agglomerates from said merged streams; and
 thereafter providing said merged gas streams for operation of downstream equipment.

37. A process as defined in claim 36 wherein said second particulate is larger than said particulate entrained in said gas stream.

38. Improved process for removal of particulates from a gaseous stream comprising the steps of:
 pulse combusting a fuel to produce a hot combustion product stream having a particulate entrained therein and an acoustic pressure wave having a frequency within the range of from about 20 to about 1500 Hz; and
 introducing into said hot combustion product stream a second particulate having a size different than the size of said particulate entrained in said hot combustion product stream for acoustically-enhanced bimodal particulate agglomeration, said second particulate being a sorbent for effectuating sorption of contaminants present in said gaseous stream.

39. A process as defined in claim 38 wherein said gaseous stream is said hot combustion product stream produced by said pulse combustion.

* * * * *